United States Patent [19]

Katho et al.

[11] Patent Number: 5,040,092
[45] Date of Patent: Aug. 13, 1991

[54] MULTILAYER CAPACITOR

[75] Inventors: Noboru Katho; Emiko Nogome, both of Nagaokakyo, Japan

[73] Assignee: Murata Manufacturing Co., Ltd., Japan

[21] Appl. No.: 554,026

[22] Filed: Jul. 17, 1990

[30] Foreign Application Priority Data

Jul. 20, 1989 [JP] Japan ................................. 1-86383
Apr. 24, 1990 [JP] Japan ................................. 2-43702

[51] Int. Cl.$^5$ .............................................. H01G 4/42
[52] U.S. Cl. .................................................. 361/321
[58] Field of Search .............. 361/308, 309, 310, 320, 361/321, 328, 329, 330; 29/25.42, 25.41; 333/338, 184

[56] References Cited

U.S. PATENT DOCUMENTS 4,424,615 1/1984 Wakino ............................. 29/25.42
4,556,929 12/1985 Tanaka et al. ..................... 361/321
4,564,782 1/1986 Ogawa ............................... 310/359

Primary Examiner—Donald A. Griffin
Attorney, Agent, or Firm—Ostrolenk, Faber, Gerb & Soffen

[57] ABSTRACT

A multilayer capacitor in which first and second groups of inner electrodes each respectively comprising a plurality of inner electrodes are arranged so as to be overlapped with each other and spaced apart by a ceramic layer in a sintered body composed of dielectric ceramics. The inner electrodes are alternately led out to first and second side surfaces of the sintered body and a pair of outer electrodes are formed on the first and second side surfaces of the sintered body. The first and second groups of inner electrodes are arranged spaced apart from each other by a ceramic layer having a thickness of "a" satisfying the condition $a \geq 2b$, where "b" is the thickness of the ceramic layer between the inner electrodes in each of the first and second groups of inner electrodes.

9 Claims, 4 Drawing Sheets

MULTILAYER CAPACITOR

BACKGROUND OF THE INVENTION

1. Field of the Invention

The present invention relates generally to a multilayer capacitor having a structure in which a plurality of inner electrodes are arranged so as to be overlapped with each other, separated by a ceramic layer in a sintered body, and more particularly, to a multilayer capacitor which is superior in Q characteristics in a high frequency band.

2. Description of the Prior Art

As is well-known, a multilayer capacitor has a structure in which a plurality of inner electrodes are arranged so as to be overlapped with each other through a ceramic layer made of dielectric ceramics and are alternately led out to different side surfaces of the dielectric ceramics. A multilayer capacitor of this type which is high in Q value in a high frequency band is required.

In order to increase the Q value, the equivalent series resistance (ESR) must be lowered. Different structures have been heretofore proposed: a structure in which one inner electrode comprises two inner electrode portions overlapped with each other through a thin ceramic layer (that is, a double electrode structure), a structure in which the wall thickness of an inner electrode is made large, and the like.

In the above described structures such as the double electrode structure and the structure in which the wall thickness of an inner electrode is made large, however, the eddy-current loss is so great that the ESR-frequency characteristics in a high frequency band are not improved, although they do achieve a decrease in the value of the ESR in a case where a direct current is caused to flow. Therefore, as shown in FIG. 2, in a high frequency band, for example, from tens of megahertz to several gigahertz, the ESR is higher. More specifically, the improvement in Q characteristics in such a high frequency band is not satisfactory.

SUMMARY OF THE INVENTION

Accordingly, an object of the present invention is to provide a multilayer capacitor which is superior in Q characteristics in a high frequency band.

According to the present invention, there is provided a multilayer capacitor having the following structure. More specifically, first and second groups of inner electrodes respectively comprising a plurality of inner electrodes each are formed in a sintered body composed of dielectric ceramics. The first and second groups of inner electrodes respectively have a plurality of inner electrodes each which are arranged so as to be overlapped with each other through a ceramic layer and are alternately led out to first and second side surfaces of the sintered body. Further, outer electrodes are respectively formed on the first and second side surfaces of the sintered body.

In the multilayer capacitor according to the present invention, the above described first and second groups of inner electrodes are arranged spaced apart from each other through a ceramic layer having a thickness of a satisfying the formula: $a \geq 2b$, where b is the thickness of the ceramic layer between the inner electrodes in each of the first and second groups of inner electrodes.

In the present invention, the thickness a of the ceramic layer between the first and second groups of inner electrodes is made larger than the thickness b of the ceramic layer between the inner electrodes in each of the groups of inner electrodes, that is $a \geq 2b$. Accordingly, the eddy-current loss between the inner electrodes located on both sides of the ceramic layer having the thickness a is reduced, thereby to lower the ESR in a high frequency band. As a result, the Q characteristics are improved. Experiments conducted by the inventors of the present application confirm that the Q characteristics are improved by approximately 25 percent, as compared with those in the conventional multilayer capacitor having the same number of electrodes. Further, since the first and second groups of inner electrodes are spaced apart from each other through the ceramic layers having the thickness b, the heat resisting strength is improved, which is because the heat stress is uniform in the sintered body.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
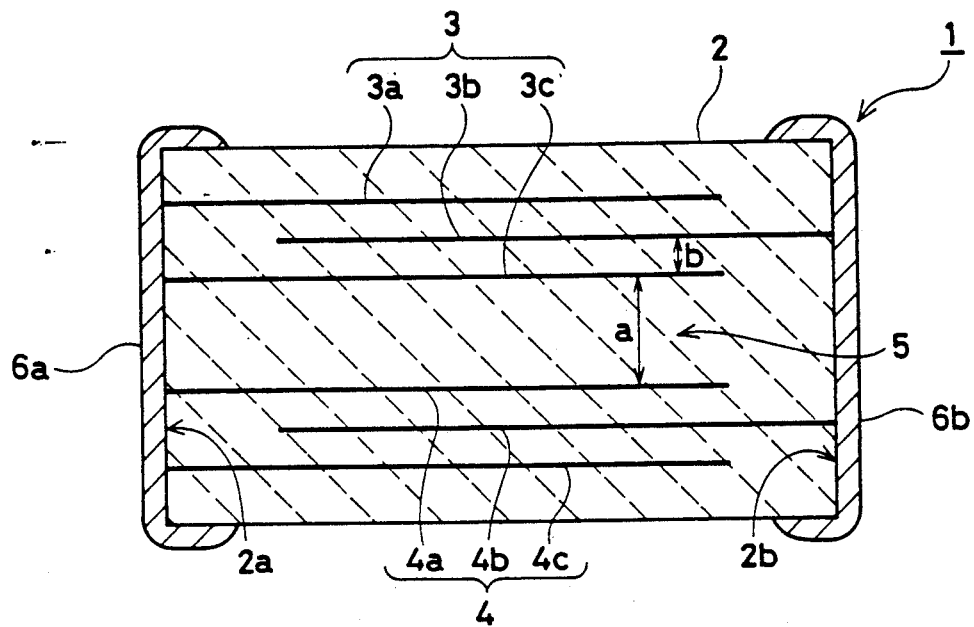
FIG. 1 is a cross sectional view showing a multilayer capacitor according to a first embodiment of the present invention.
Figure 2:
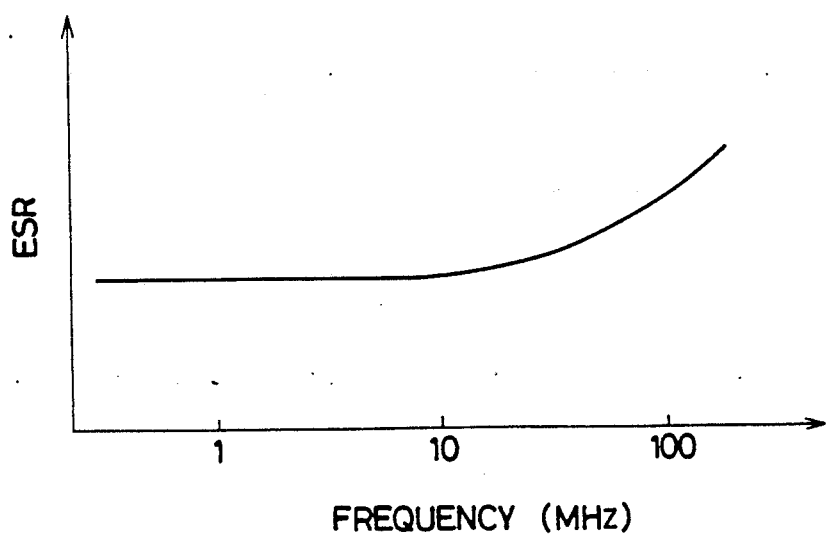
FIG. 2 is a diagram showing ESR-frequency characteristics of a conventional multilayer capacitor.

FIG. 1 is a cross sectional view showing a multilayer capacitor according to one embodiment of the present invention. In a multilayer capacitor 1 according to the present embodiment, a plurality of inner electrodes 3a to 3c and 4a to 4c are respectively formed so as to be overlapped with each other through a ceramic layer in a sintered body 2 composed of dielectric ceramics. In the present embodiment, the inner electrodes 3a to 3c constitute a first group 3 of inner electrodes, and the inner electrodes 4a to 4c constitute a second group 4 of inner electrodes.

More specifically, in the first and second groups 3 and 4 of inner electrodes, the inner electrodes 3a to 3c and 4a to 4c are respectively arranged so as to be overlapped with each other through a ceramic layer having a thickness of b.

On the other hand, the first and second groups 3 and 4 of inner electrodes are spaced apart from each other through a ceramic layer 5 having a thickness of a. The thickness a of this ceramic layer 5 is selected so as to satisfy the relation $a \geq 2b$.

The inner electrodes 3a to 3c and 4a to 4c in the first and second groups 3 and 4 of inner electrodes are alternately led out to first and second side surfaces 2a and 2b of the sintered body 2 in the direction of thickness, to be electrically connected to outer electrodes 6a and 6b, respectively. The inner electrodes 3c and 4a spaced apart from each other through the ceramic layer 5 are both led out to the first side surface 2a, to be electrically connected to the outer electrode 6a.

The multilayer capacitor 1 according to the present embodiment is characterized in that the first and second groups 3 and 4 of inner electrodes are spaced apart from each other through the ceramic layer 5 having the thickness a.

Since the multilayer capacitor 1 is constructed as described above, the eddy-current losses in the first and second groups 3 and 4 of inner electrodes are cancelled. As a result, the ESR in a high frequency band is lowered.

Figure 3:
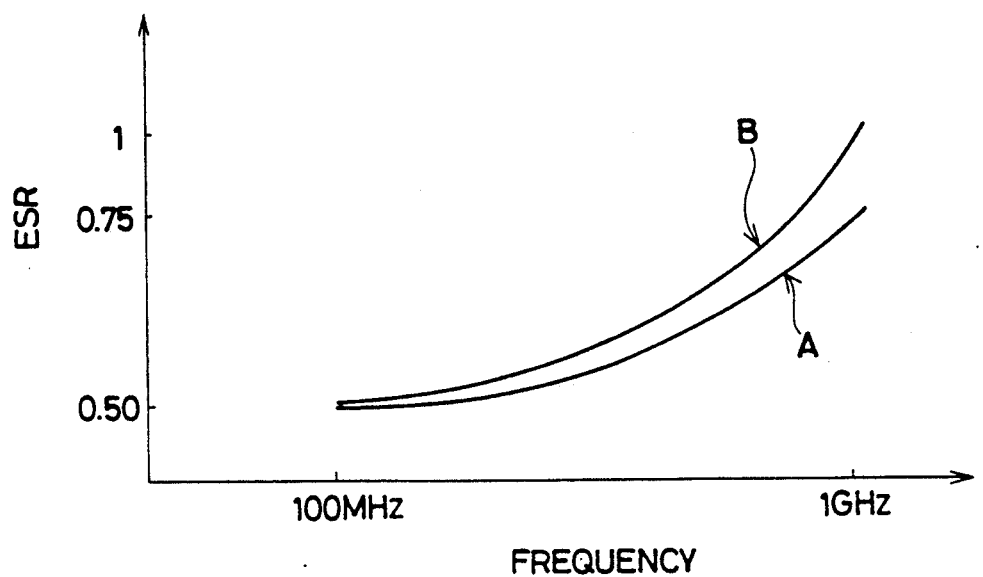
FIG. 3 is a diagram showing ESR-frequency characteristics of the multilayer capacitor according to the first embodiment of the present invention.

The results of measurements made of ESR-frequency characteristics of the multilayer capacitor 1 according to the above described embodiment are shown in FIG. 3. In the multilayer capacitor 1 used for the measurements shown in FIG. 3, the thickness b of the ceramic layer between the inner electrodes 3a to 3c or 4a to 4c in each of the first and second groups of inner electrodes is 20 μm. A solid line A indicates characteristics in a case where the thickness a of the above described ceramic layer 5 is 300 μm, and a solid line B indicates characteristics in a case where the thickness a of the ceramic layer 5 is 20 μm (that is, equal to the thickness b of the ceramic layer between the other inner electrodes).

As can be seen from FIG. 3, if the structure according to the present embodiment is used, that is, the relation $a \geq 2b$ is set, the value of ESR is smaller in the high frequency band, as represented by the solid line A.

Figure 4:
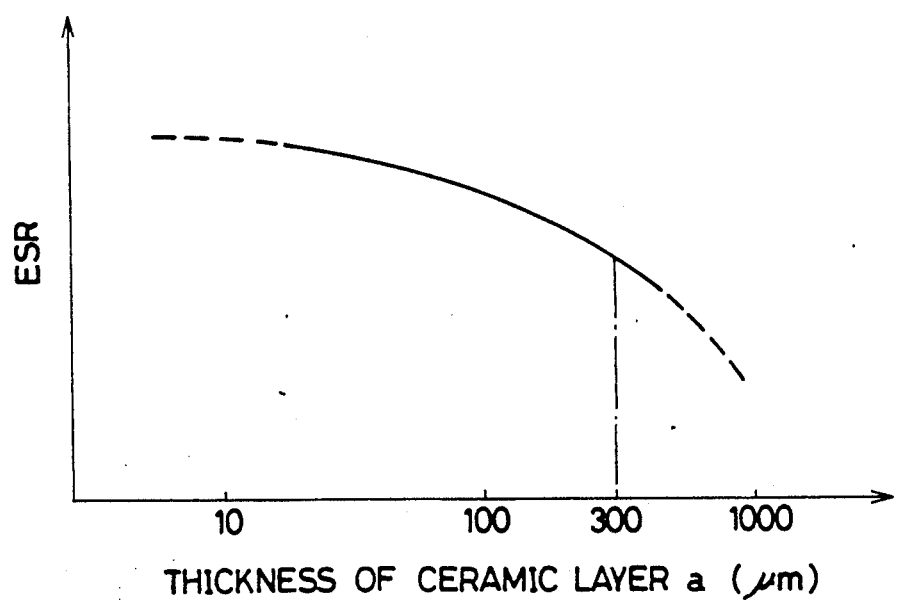
FIG. 4 is a diagram showing the relation between the value of ESR and the thickness a at 1 GHz.

Furthermore, FIG. 4 shows the change at value of ESR in 1 GHz in a case where the thickness a of the ceramic layer 5 is changed from 20 μm to 300 μm with respect to the multilayer capacitor 1 shown in FIG. 1. FIG. 4 shows that the value of ESR in 1 GHz can be decreased by increasing the thickness a of the above ceramic layer 5. $a \geq 2b$ is set because the effect of decreasing the value of ESR is not satisfactory if $b < a \leq 2b$, as can be seen from FIG. 4.

Additionally, the larger the thickness a of the ceramic layer 5 is as compared with 2b, the smaller the value of ESR can be. However, the upper limit of the thickness a of the ceramic layer 5 is determined by other factors such as the restriction of the size of the multilayer capacitor.

Furthermore, the thickness a of the ceramic layer 5 can be easily set to that satisfying $a \geq 2b$ by increasing the number of ceramic green sheets to be laminated in fabricating the multilayer capacitor. More specifically, the thickness a of the ceramic layer 5 can be set by laminating a plurality of ceramic green sheets having the same thickness as that of a ceramic green sheet for constituting the ceramic layer between the inner electrodes 3a to 3c or 4a to 4c or by inserting a ceramic green sheet thicker than the other ceramic green sheets.

Figure 5:
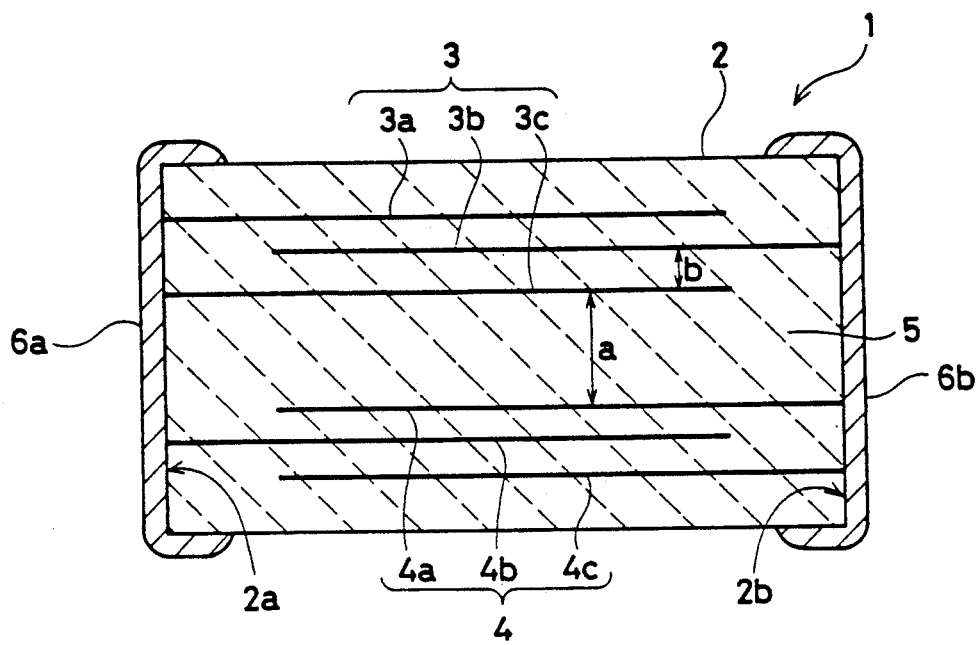
FIG. 5 is a cross sectional view showing a modified example of the multilayer capacitor according to the embodiment shown in FIG. 1.

Although in the embodiment shown in FIG. 1, the inner electrodes 3c and 4a are electrically connected to the same outer electrode 6a, that is, the same potential, the inner electrodes 3c and 4a located on both sides of the ceramic layer 5 may be arranged so as to be respectively connected to different outer electrodes, that is, different potentials as shown in FIG. 5. Even in such a case, the effect of the present invention is obtained.

In the embodiment shown in FIG. 1, two groups of inner electrodes are arranged in the sintered body 2. In the present invention, however, the number of the above described first and second groups of inner electrodes spaced apart from each other through the ceramic layer having the thickness a may be a total of three or more.

Figure 6:
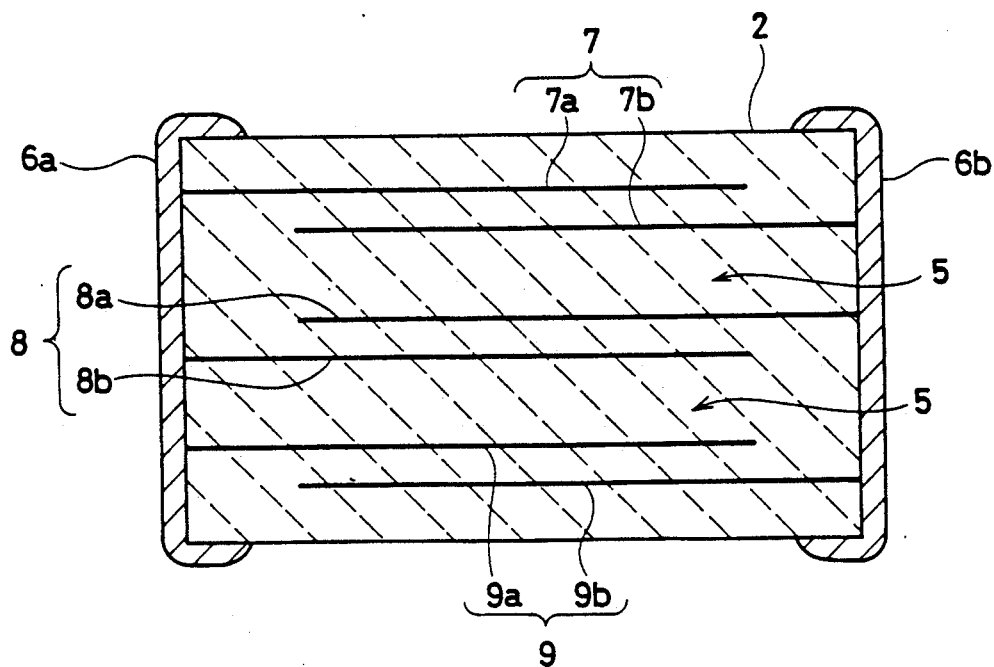
FIG. 6 is a cross sectional view showing a multilayer capacitor according to another embodiment of the present invention.

For example, as shown in FIG. 6, three groups 7 to 9 of inner electrodes comprising inner electrodes 7a, 7b, 8a, 8b, 9a and 9b may be arranged in a sintered body 2. In this case, the groups 7 and 8 of inner electrodes respectively constitute first and second groups of inner electrodes, and the groups 8 and 9 of inner electrodes respectively constitute first and second groups of inner electrodes.

Figure 7:
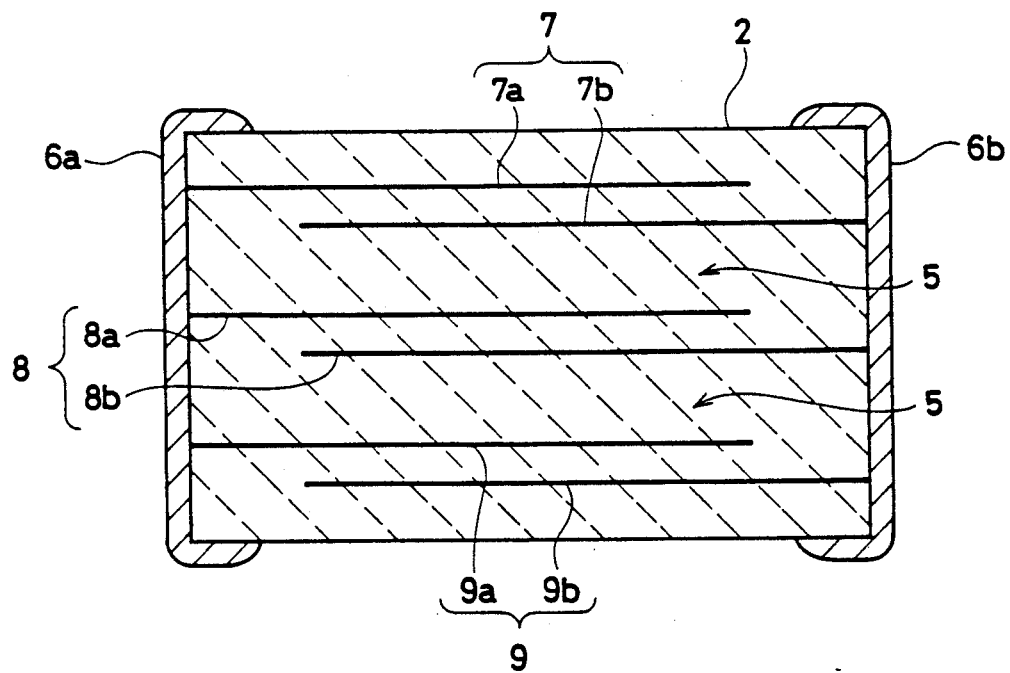
FIG. 7 is a cross sectional view showing a modified example of the multilayer capacitor according to the embodiment shown in FIG. 6.

Furthermore, in a multilayer capacitor according to the embodiment shown in FIG. 6, the inner electrodes 7b and 8a located on both sides of a ceramic layer 5 are connected to the same outer electrode 6b, that is, the same potential. Similarly, the inner electrodes 8b and 9a are connected to the same outer electrode 6a, that is, the same potential. As shown in FIG. 7, however, inner electrodes located on both sides of a ceramic layer 5 may be respectively connected to different outer electrodes, that is, different potentials. More specifically, in a multilayer capacitor shown in FIG. 7, inner electrodes 7b and 8a located on both sides of a ceramic layer 5 are respectively connected to different outer electrodes 6b and 6a, that is, different potentials. Similarly, inner electrodes 8b and 9a are respectively connected to different outer electrodes 6b and 6a, that is, different potentials.

Additionally, in the multilayer capacitor shown in FIG. 7, the inner electrode 9a may be electrically connected not to the outer electrode 6a but to the outer electrode 6b and an inner electrode 9b may be electrically connected to the outer electrode 6a such that the inner electrodes located on both sides of one of the ceramic layers 5, for example, the inner electrodes 8b and 9a, are electrically connected to the same outer electrode 6b, that is, the same potential.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multilayer capacitor comprising:
   a sintered body composed of dielectric ceramics;
   first and second groups of inner electrodes, each respectively comprising a plurality of inner electrodes, which are arranged so as to be overlapped with each other and separated by a ceramic layer in said sintered body and are alternately led out to first and second side surfaces of the sintered body; and
   a pair of outer electrodes formed on the first and second side surfaces of said sintered body,
   said first and second groups of inner electrodes being arranged separated by a ceramic layer having a thickness of "a" satisfying the condition $a \geq 2b$, where "b" is the thickness of the ceramic layer between the inner electrodes in each of the first and second groups of inner electrodes.

2. The multilayer capacitor according to claim 1, wherein a pair of inner electrodes located at opposite respective sides of said ceramic layer having the thickness "a" are connected to different outer electrodes.

3. The multilayer capacitor according to claim 2, wherein each of said first and second groups of inner electrodes includes a total of three or more inner electrodes.

4. The multilayer capacitor according to claim 2, wherein said different outer electrodes are connected respectively to different potentials.

5. The multilayer capacitor according to claim 1, wherein a pair of inner electrodes located at opposite respective sides of said ceramic layer having the thickness "a" are connected to the same outer electrode.

6. The multilayer capacitor according to claim 5, wherein said pair of inner electrodes are connected respectively to the same potential.

7. The multilayer capacitor according to claim 5, wherein each of said first and second groups of inner electrodes includes a total of three or more inner electrodes.

8. The multilayer capacitor according to claim 1, wherein said first and second side surfaces constitute a pair of side surfaces on opposite sides of the sintered body.

9. A multilayer capacitor comprising:
a sintered body composed of dielectric ceramics;
first and second groups of inner electrodes, each respectively comprising a plurality of inner electrodes, which are arranged so as to be overlapped with each other and separated by a ceramic layer in said sintered body and are alternately led out to first and second side surfaces of the sintered body; and
a pair of outer electrodes formed on the first and second side surfaces of said sintered body,
said first and second groups of inner electrodes being arranged separated by a ceramic layer having a thickness of "a" satisfying the condition a is greater than or equal to 2$b$, where "b" is the thickness of the ceramic layer between the inner electrodes in each of the first and second groups of inner electrodes;
wherein a pair of inner electrodes located at opposite respective sides of said ceramic layer having the thickness "a" are connected to the same outer electrode; and
wherein the number of said first and second groups of inner electrodes is a total of three or more.

* * * * *